United States Patent [19]

Rosenthal

[11] Patent Number: 4,730,503
[45] Date of Patent: Mar. 15, 1988

[54] LINEAR DIFFERENTIAL MECHANISM

[75] Inventor: Dov Rosenthal, Kfar Yedidia, Israel

[73] Assignee: Robomatix Ltd., Petach-Tikva, Israel

[21] Appl. No.: 818,355

[22] Filed: Jan. 13, 1986

[30] Foreign Application Priority Data

Mar. 7, 1985 [IL] Israel .................................. 74538

[51] Int. Cl.$^4$ ............................................. F04B 21/02
[52] U.S. Cl. ........................................ 74/58; 74/89.15;
74/424.8 R
[58] Field of Search ................... 74/424.8 B, 424.8 R,
74/424.8 A, 89.15, 665 GD, 58, 59

[56] References Cited

U.S. PATENT DOCUMENTS

| 260,366 | 7/1882 | Burr | 74/424.8 B |
|---|---|---|---|
| 2,340,029 | 1/1944 | Weingartner | 74/424.8 B |
| 3,187,601 | 6/1965 | Glenn | 74/424.8 R |
| 3,779,094 | 12/1973 | La Barre | 74/424.8 R |
| 3,803,926 | 4/1974 | Winter | 74/424.8 B X |
| 3,844,177 | 10/1974 | Bourassa | 74/424.8 B |
| 4,343,200 | 8/1982 | Alworth et al. | 74/424.8 R |
| 4,509,379 | 4/1985 | Westmoreland | 74/58 |

Primary Examiner—Randolph A. Reese
Assistant Examiner—Peter M. Cuomo
Attorney, Agent, or Firm—Spencer & Frank

[57] ABSTRACT

A differential mechanism including a housing, an elongate shaft disposed in the housing which is coupled to an object to be moved with the shaft defining a right-handed thread along a first portion thereof and a left-handed thread along a second portion thereof. A right-handed nut is mounted on the first portion of the shaft in engagement with the right-handed thread, and a left-handed nut is mounted on the second portion of the shaft in engagement with the left-handed thread, with the right-handed and left-handed nuts being fixedly mounted for independent rotation within the housing, whereby selective rotation and prevention of rotation of said right-handed and left-handed nuts effects rotational and/or translational movement of said shaft relative to said housing.

11 Claims, 3 Drawing Figures

LINEAR DIFFERENTIAL MECHANISM

FIELD OF THE INVENTION

The present invention relates to differential mechanisms in general, and, in particular, to mechanisms for converting rotational motion into linear or rotational motion, or both.

BACKGROUND OF THE INVENTION

There are many occasions, particularly in industrial robotics and machining operations, when it is desired to provide movement of an object linearly and/or rotationally. Movement within a single plane, along an x and y axis, poses little problem. However, movement in the remaining two degrees of freedom, namely along a z axis and rotation about this axis, is more difficult to provide.

At present, a number of mechanisms are known for providing linear or rotational movement. These include mechanisms providing a screw for linear movement and a shaft actuated by a gear train for rotational movement, and mechanisms including a motor actuating an elongate rack for linear movement and a second motor to produce rotation. Alternatively, the entire apparatus which is to perform the operation can be moved linearly or rotated.

These mechanisms suffer from the fact that they are heavy and cumbersome, as well as being costly to manufacture. Their size and weight are particularly disadvantageous in applications where high speed motion is required or desired.

SUMMARY OF THE INVENTION

It is, therefore, an object of the present invention to provide a simple mechanism for effecting linear and/or rotational movement, which is light in weight, fast in operation and relatively inexpensive to manufacture.

There is thus provided, in accordance with the present invention, a differential mechanism including a housing, an elongate shaft disposed in the housing which is coupled to an object to be moved, the shaft defining a right-handed thread along a first portion thereof and a left-handed thread along a second portion thereof, a right-handed nut is mounted on the first portion of the shaft in engagement with the right-handed thread, and a left-handed nut mounted on the second portion of the shaft in engagement with the left-handed thread, the right- and left-handed nuts being fixedly mounted for independent rotation within the housing.

According to a preferred embodiment, the first and second portions of the shaft are coincident, the left- and right-handed threads thus being superimposed. According to an alternative embodiment, the first and second portions of the shaft are spaced from one another along the length of the rod.

Further, according to a preferred embodiment of the invention, the mechanism also includes means for selectively rotating the right-handed nut or preventing it from rotating and means for selectively rotating the left-handed nut or preventing it from rotating. Preferably, the right-handed nut and the left-handed nut can be rotated one at a time, simultaneously in the same direction, or simultaneously in opposite directions, either at the same speed or at different speeds.

BRIEF DESCRIPTION OF THE DRAWINGS

The apparatus of the present invention will be further understood and appreciated from the following detailed description taken in conjunction with the drawings in which.

DETAILED DESCRIPTION OF THE INVENTION

Figure 1:
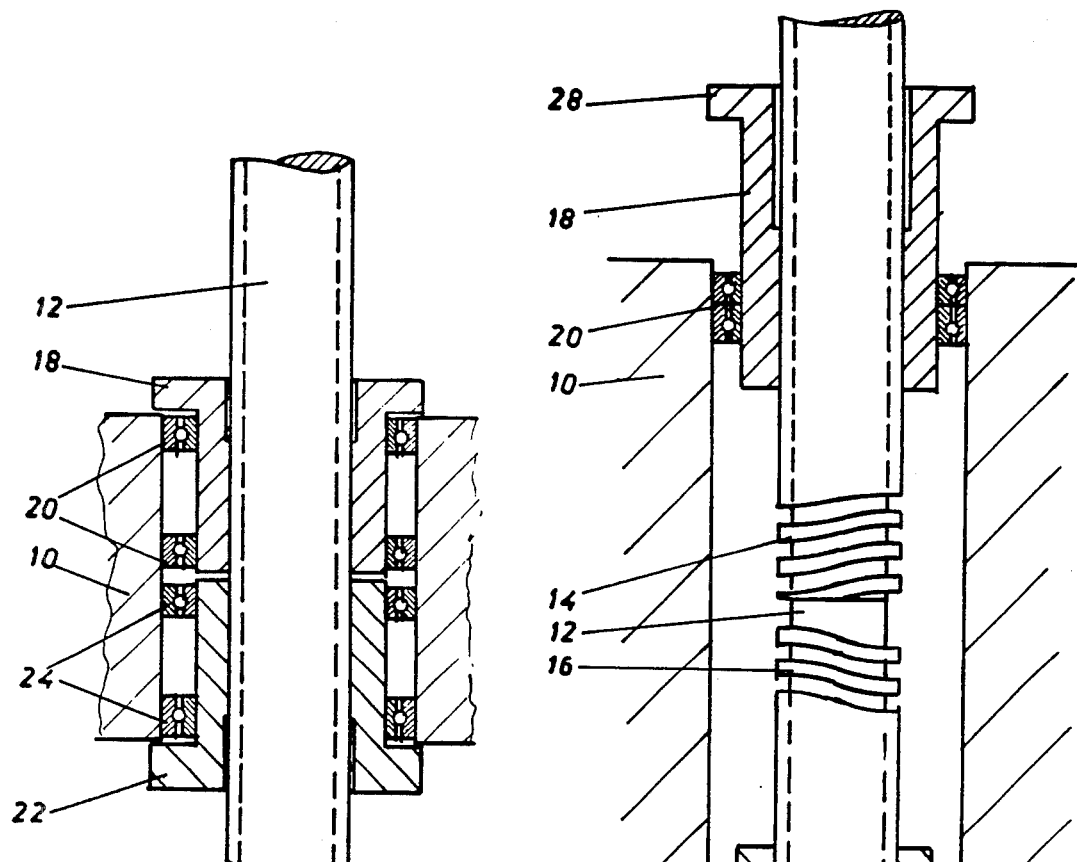
FIG. 1 is a schematic illustration of a differential mechanism constructed and operative in accordance with an embodiment of the present invention.

With reference to FIG. 1 there is shown a differential mechanism constructed and operative in accordance with an embodiment of the present invention and comprising a housing 10. Disposed within the housing 10 is an elongate shaft 12 defining a right-handed screw thread 14 on one portion thereof and defining a left-handed screw thread 16 on a second portion thereof. In the embodiment illustrated in FIG. 1, the right-hand screw thread 14 is spaced from the left-handed screw thread 16 along the length of shaft 12.

Fixedly mounted within housing 10 for rotational but not linear movement, as by means of bearings 20, is a first nut 18 having a screw thread for engagement of thread 14 of shaft 12, in this case, a right-handed thread. Also fixedly mounted within housing 10 for rotational but no linear movement, as by means of bearings 24, is a second nut defining a screw thread for engagement of thread 16 of shaft 12, in this case, a left-handed thread.

Shaft 12 is disposed within nuts 18 and 22 for linear and rotational movement relative to housing 10, the shaft being coupled by any suitable means (not shown) to an object to be moved.

It will be appreciated that the particular location of the left-handed and right-handed threads on shaft 12 is unimportant as long as the threads are engaged by the complementary nut.

Coupled in any conventional manner to the right-handed nut 18 is means 28 for rotating it or for preventing it from rotation. Similarly coupled to left-handed nut 22 is means 30 for rotating it or preventing its rotation. Means 28 and 30 may comprise any conventional means, such as, for example, pulleys actuated by a motor-driven belt or chain. Alternatively, any other suitable means for independently rotating or preventing rotation of nuts 18 and 22 may be employed.

Operation of the differential mechanism of the present invention will now be described with further reference to FIG. 1. In order to move shaft 12 linearly in either direction, both left- and right-handed nuts 18 and 22 are simultaneously rotated in opposite directions by rotating means 28 and 30. Thus, rotation of nut 18 in a clockwise direction in the sense of FIG. 1, as indicated by arrow 32, and rotation of nut 22 in the counter-clockwise direction will cause shaft 12 to advance upwardly without rotation.

Rotation of nut 18 counter-clockwise and of nut 22 in a clockwise direction will result in advancing the shaft in the downward direction.

If it is desired to rotate the shaft, it is merely necessary to rotate both nuts 18 and 22 simultaneously in the same direction, either both clockwise or counter-clockwise, depending upon the desired resultant rotation of shaft 12.

Rotation of either one of nuts 18 and 22 alone, while the other is prevented from rotating, will result in both rotation and linear movement of shaft 12, but at one half the rate and one half of the distance of that obtained when both nuts are rotated.

In the foregoing discussion, it has been assumed that the pitches of thread 14 and thread 16 are identical. However, it will be appreciated that the linear speed of shaft 12 can be controlled by changing the pitch of one thread relative to another, and not only by changing the speed of rotation of nuts 18 and 22.

It is a particular feature of the present invention that a simple, light-weight differential mechanism is provided which mechanically translates rotational motion from one or two independent input sources selectively into either rotational or linear motion or both as desired. Such translation is generally not possible with conventional differential devices. Furthermore, the mechanism of the present invention provides convenient drive from both sides.

It is a further particular feature that the load on the shaft is divided by this mechanism. The particular division of the load can be controlled by changing the pitch of one thread relative to the other on the shaft.

Figure 2:
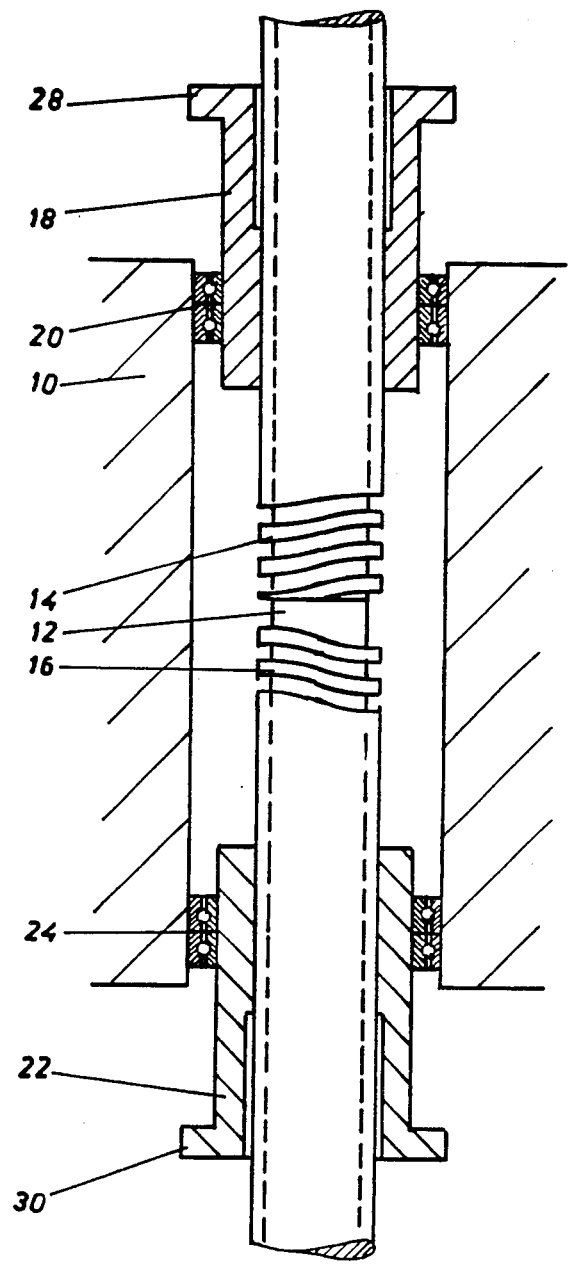
FIG. 2 is a schematic illustration of a differential mechanism constructed and operative in accordance with an alternative embodiment of the present invention.
Figure 3:
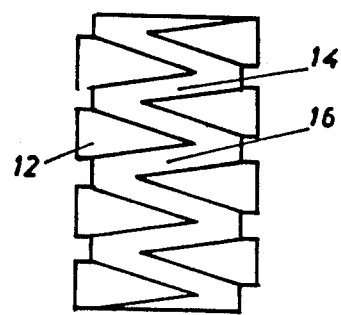
FIG. 3 is a detail in plan of a section of the threaded shaft of FIG. 2.

Referring now to FIG. 2, there is shown a schematic illustration of differential apparatus constructed and operative in accordance with an alterative embodiment of the present invention. It is substantially identical to the mechanism shown in FIG. 1, like elements being indicated by like reference numerals, with the exception of the location of threads 14 and 16 on shaft 12. A detailed illustration of the threaded portion of shaft 12 shown in FIG. 3 wherein it can be seen that right-handed thread 14 is superimposed on left-handed thread 16. Nuts 18 and 22 can thus be mounted adjacent one another in housing 10, permitting the reduction of the length of shaft 12 and, thus, reducing the weight of the entire mechanism. This results in a smaller, more compact mechanism which is, accordingly, faster in operation and less expensive to manufacture. It will be appreciated that, although the threads are superimposed, the right-handed nut will engage only the right-handed thread and the left-handed nut only the left-handed thread.

It will be appreciated that although a conventional screw is illustrated in FIGS. 1 and 2, alternatively a ball screw or any other screw and nut means may be employed. It will be appreciated that the word "nut" as used hereinabove also includes any mechanical equivalent thereof, i.e., a worm gear.

It is a particular feature of the present invention that the differential mechanism of the invention can be orientated for use with the shaft in a horizontal, vertical or angled orientation.

It will be appreciated by those skilled in the art that the mechanism of the present invention is not limited to what has been shown and described hereinabove by way of example. Rather, the scope of the invention is limited solely by the claims which follow.

I claim:

1. A differential mechanism comprising:
   a housing;
   an elongate shaft disposed in said housing, said shaft defining a right-handed thread along a first portion thereof and a left-handed thread along a second portion thereof;
   a right-handed nut rotatably mounted within said housing and arranged to engage the right-handed thread of said shaft;
   a left-handed nut rotatably mounted within said housing and arranged to engage the left-handed thread of said shaft;
   said right-handed and left-handed nuts being mounted in the housing at a fixed axial distance from one another;
   first means on said right-handed nut for selectively rotating said right-handed nut; and
   second means on said left-handed nut for selectively rotating said left-handed nut, with said first and second means being operative independent of one another to produce rotation of the respective said nuts, whereby selective rotation of said left-handed and right-handed nuts effects movement of said shaft relative to said housing.

2. A differential mechanism according to claim 1 wherein said right-handed thread and said left-handed thread are superimposed on the shaft.

3. A differential mechanism according to claim 1 wherein said right-handed thread and said left-handed thread are spaced from one another along the length of the shaft.

4. A differential mechanism according to claim 1 and wherein the pitch of said right-handed thread is the same as the pitch of said left-handed thread.

5. A differential mechanism according to claim 2 and wherein the pitch of said right-handed thread is the same as the pitch of said left-handed thread.

6. A differential mechanism according to claim 3 and wherein the pitch of said right-handed thread is the same as the pitch of said left-handed thread.

7. A differential mechanism according to claim 1 and wherein the pitch of said right-handed thread is different from the pitch of said left-handed thread.

8. A differential mechanism according to claim 2 and wherein the pitch of said right-handed thread is different from the pitch of said left-handed thread.

9. A differential mechanism according to claim 3 and wherein the pitch of said right-handed thread is different from the pitch of said left-handed thread.

10. A differential mechanism comprising:
    a housing;
    an elongate shaft disposed in said housing, said shaft defining a right-handed thread along a first portion thereof and a left-handed thread along a second portion thereof;
    a right-handed nut engaging said right-handed thread of said shaft;
    first means, fixedly mounted in said housing, for rotatably mounting said right-handed nut within said housing;
    a left-handed nut engaging said left-handed thread of said shaft;
    second means, fixedly mounted in said housing at a given distance along the axis of said shaft from said first means, for rotatably mounting said left-handed nut within said housing; and
    respective means on said nuts for coupling said nuts to respective input drive devices for selectively rotating said nuts independent of one another, whereby selective rotation and prevention of rotation of said right-handed and left-handed nuts effects rotational and/or translational movement of said shaft relative to said housing.

11. A differential mechanism according to claim 10 wherein said first and second means comprise respective bearings directly connected between said housing and the respective said nuts.

* * * * *